(12) United States Patent
Hillesund et al.

(10) Patent No.: US 8,976,622 B2
(45) Date of Patent: Mar. 10, 2015

(54) METHODS FOR CONTROLLING TOWED MARINE SENSOR ARRAY GEOMETRY

(75) Inventors: Øyvind Hillesund, Nesbru (NO); Nils Lunde, Houston, TX (US)

(73) Assignee: PGS Geophysical AS, Oslo (NO)

( * ) Notice: Subject to any disclaimer, the term of this patent is extended or adjusted under 35 U.S.C. 154(b) by 1201 days.

(21) Appl. No.: 12/409,694

(22) Filed: Mar. 24, 2009

(65) Prior Publication Data

US 2009/0262601 A1  Oct. 22, 2009

Related U.S. Application Data

(63) Continuation-in-part of application No. 12/148,610, filed on Apr. 21, 2008, now abandoned.

(51) Int. Cl.
*G01V 1/38* (2006.01)

(52) U.S. Cl.
USPC .......................................................... 367/16

(58) Field of Classification Search
USPC .......................................................... 367/16
See application file for complete search history.

(56) References Cited

U.S. PATENT DOCUMENTS

| | | | |
|---|---|---|---|
| 3,581,273 A | 5/1971 | Hedberg | |
| 4,033,278 A | 7/1977 | Waters | |
| 4,068,208 A | 1/1978 | Rice, Jr. et al. | |
| 4,404,664 A | 9/1983 | Zachariadis | |
| 4,481,611 A | 11/1984 | Burrage | |
| 4,798,156 A | 1/1989 | Langeland et al. | |
| 4,912,682 A | 3/1990 | Norton, Jr. et al. | |
| 5,443,027 A | 8/1995 | Owsley et al. | |
| H0001490 H | 9/1995 | Thompson et al. | |
| 5,668,775 A | 9/1997 | Hatteland | |
| 5,761,153 A | 6/1998 | Gikas et al. | |
| 6,011,752 A | 1/2000 | Ambs et al. | |
| 6,144,342 A | 11/2000 | Beartheas et al. | |
| 6,229,760 B1 | 5/2001 | Ambs | |
| 6,498,768 B1 | 12/2002 | Gjestrum et al. | |
| 6,525,992 B1 | 2/2003 | Olivier et al. | |
| 6,618,321 B2 | 9/2003 | Brunet | |
| 6,655,311 B1 | 12/2003 | Martin et al. | |
| 6,671,223 B2 | 12/2003 | Bittleston | |
| 6,691,038 B2 | 2/2004 | Zajac | |
| 6,766,253 B2 | 7/2004 | Burns et al. | |
| 6,932,017 B1 | 8/2005 | Hillesund et al. | |
| 7,047,898 B2 | 5/2006 | Petersen et al. | |
| 7,080,607 B2 | 7/2006 | Hillesund et al. | |

(Continued)

FOREIGN PATENT DOCUMENTS

GB   2 364 388 B   8/2002
GB   2 441 411 A   3/2008

OTHER PUBLICATIONS (Jul. 2, 2010) Partial European Search Report.

(Continued)

*Primary Examiner* — Mark Hellner

(57) ABSTRACT

A method for towing a streamer array includes moving a vessel along a body of water. Streamers are towed by vessel. A relative position is determined at selected points along each streamer with respect to the vessel. At least one of the streamers is deflected at least one longitudinal position along the streamer in response to the determined positions to maintain the streamers in a selected geometry. The selected geometry is related to one of survey vessel heading, energy source trajectory, previously plotted sensor trajectory and a lateral separation related to distance from the towing vessel.

15 Claims, 3 Drawing Sheets

(56) References Cited

U.S. PATENT DOCUMENTS

| | | |
|---|---|---|
| 7,092,315 B2 | 8/2006 | Olivier |
| 7,161,871 B2 | 1/2007 | Brunet |
| 7,162,967 B2 | 1/2007 | Hillesund et al. |
| 7,190,634 B2 | 3/2007 | Lambert et al. |
| 7,203,130 B1 | 4/2007 | Welker |
| 7,221,620 B2 | 5/2007 | Planke et al. |
| 7,222,579 B2 | 5/2007 | Hillesund et al. |
| 7,267,070 B2 | 9/2007 | Le Page et al. |
| 7,293,520 B2 | 11/2007 | Hillesund et al. |
| 7,377,224 B2 | 5/2008 | Ryan et al. |
| 7,391,674 B2 | 6/2008 | Welker |
| 7,403,448 B2 | 7/2008 | Welker et al. |
| 7,415,936 B2 | 8/2008 | Storteig et al. |
| 7,417,924 B2 | 8/2008 | Vigen et al. |
| 7,423,929 B1 | 9/2008 | Olivier |
| 7,558,678 B2 * | 7/2009 | Jones ............................ 702/14 |
| 7,577,060 B2 | 8/2009 | Toennessen et al. |
| 7,957,220 B2 * | 6/2011 | Howlid et al. .................. 367/16 |
| 2003/0208320 A1 | 11/2003 | Zajac |
| 2004/0060498 A1 | 4/2004 | Petersen et al. |
| 2006/0256653 A1 | 11/2006 | Toennessen et al. |
| 2007/0019504 A1 | 1/2007 | Howlid et al. |
| 2007/0041272 A1 | 2/2007 | Hillesund et al. |
| 2007/0064526 A1 | 3/2007 | Holo |
| 2007/0091719 A1 | 4/2007 | Falkenberg et al. |
| 2007/0127312 A1 | 6/2007 | Storteig et al. |
| 2007/0223307 A1 | 9/2007 | Storteig et al. |
| 2007/0223308 A1 | 9/2007 | Frivik et al. |
| 2008/0008033 A1 | 1/2008 | Fossum et al. |
| 2008/0262738 A1 | 10/2008 | Welker |
| 2008/0304358 A1 | 12/2008 | Mellier et al. |
| 2008/0316859 A1 | 12/2008 | Welker et al. |
| 2009/0003135 A1 | 1/2009 | Mellier et al. |
| 2009/0030605 A1 | 1/2009 | Breed |
| 2009/0141587 A1 | 6/2009 | Welker et al. |
| 2009/0211509 A1 | 8/2009 | Olivier et al. |
| 2009/0262601 A1 | 10/2009 | Hillesund et al. |
| 2010/0118644 A1 | 5/2010 | Seale et al. |
| 2010/0202249 A1 | 8/2010 | Goujon et al. |
| 2011/0286302 A1 | 11/2011 | Welker et al. |

OTHER PUBLICATIONS

James A. Musser, Mike Burnham, (2006), "Streamer Positioning and Spread Stabilization for 4D Seismic"; SEG/New Orleans 2006 Annual Meeting, pp. 6-9.
Office Action, Mail Date of Apr. 22, 2009 from USPTO for U.S. Appl. No. 12/148,610.
(Oct. 19, 2010) Extended European Search Report.
European Search Report in Application No. 11167593.0 dated Feb. 29, 2012, 7 pages.

* cited by examiner

METHODS FOR CONTROLLING TOWED MARINE SENSOR ARRAY GEOMETRY

CROSS-REFERENCE TO RELATED APPLICATIONS

The present application is a Continuation-In-Part of U.S. patent application Ser. No. 12/148,610 filed on Apr. 21, 2008 now abandoned.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine geophysical surveying. More particularly, the invention relates to methods for controlling the spatial distribution or geometry of an array of geophysical sensor streamers towed behind a survey vessel.

2. Background Art

Marine geophysical surveying systems such as seismic acquisition systems and electromagnetic survey systems are used to acquire geophysical data from formations disposed below the bottom of a body of water, such as a lake or the ocean. Marine seismic surveying systems, for example, typically include a seismic survey vessel having onboard navigation, seismic energy source control, and geophysical data recording equipment. The seismic survey vessel is typically configured to tow one or more (typically a plurality) of laterally spaced apart sensor streamers through the water. At selected times, the seismic energy source control equipment causes one or more seismic energy sources (which may be towed in the water by the seismic vessel or by another vessel) to actuate. Signals generated by various sensors on the one or more streamers in response to detected seismic energy are ultimately conducted to the recording equipment. A record with respect to time is made in the recording system of the signals generated by each sensor (or groups of such sensors). The recorded signals are later interpreted to infer the structure and composition of the formations below the bottom of the body of water. Corresponding components for inducing electromagnetic fields and detecting electromagnetic phenomena originating in the subsurface in response to such imparted fields may be used in marine electromagnetic geophysical survey systems.

The one or more sensor streamers are in the most general sense long cables that have geophysical sensors disposed at spaced apart positions along the length of the cables. A typical streamer can extend behind the geophysical survey vessel for several kilometers. Because of the great length of the typical streamer, the streamer may not travel entirely in a straight line behind the survey vessel at every point along its length due to interaction of the streamer with the water and currents in the water, among other factors.

Streamers towed by a vessel configured for towing multiple streamers are associated with equipment that maintain the forward ends of the streamers at selected lateral distances from each other and from the centerline of the survey vessel as they are towed through the water. Such multiple streamer systems are used in what are known as three dimensional and four dimensional geophysical surveys. A four dimensional seismic survey is a three dimensional survey over a same area of the Earth's subsurface repeated at selected times. The individual streamers in such systems are affected by the same forces that affect a single streamer.

The quality of geophysical images of the Earth's subsurface produced from three dimensional surveys is affected by how well the positions of the individual sensors on the streamers are controlled. The quality of images generated from the detected signals also depends to an extent on the relative positions of the sensors being maintained throughout the geophysical survey. Various devices are known in the art for positioning streamers laterally and/or at a selected depth below the water surface. U.S. Pat. No. 5,443,027 issued to Owsley et al., for example, describes a lateral force device for displacing a towed underwater acoustic cable that provides displacement in the horizontal and vertical directions. The device has a hollow spool and a rotationally mounted winged fuselage. The hollow spool is mounted on a cable with cable elements passing therethrough. The winged fuselage is made with the top half relatively positively buoyant and the bottom half relatively negatively buoyant. The winged fuselage is mounted about the hollow spool with clearance to allow rotation of the winged fuselage. The difference in buoyancy between the upper and lower fuselage maintains the device in the correct operating position. Wings on the fuselage are angled to provide lift in the desired direction as the winged fuselage is towed through the water. The device disclosed in the Owsley et al. patent provides no active control of direction or depth of the streamer, however.

U.S. Pat. No. 6,011,752 issued to Ambs et al. describes a seismic streamer position control module having a body with a first end and a second end and a bore therethrough from the first end to the second end for receiving a seismic streamer therethrough. The module has at least one control surface, and at least one recess in which is initially disposed the at least one control surface. The at least one control surface is movably connected to the body for movement from and into the at least one recess and for movement, when extended from the body, for attitude adjustment. Generally, the device described in the Ambs et al. patent is somewhat larger diameter, even when closed, than the streamer to which it is affixed, and such diameter may become an issue when deploying and retrieving streamers from the water.

U.S. Pat. No. 6,144,342 issued to Bertheas et al. describes a method for controlling the navigation of a towed seismic streamer using "birds" affixable to the exterior of the streamer. The birds are equipped with variable-incidence wings and are rotatably fixed onto the streamer. Through a differential action, the wings allow the birds to be turned about the longitudinal axis of the streamer so that a hydrodynamic force oriented in any given direction about the longitudinal axis of the streamer is obtained. Power and control signals are transmitted between the streamer and the bird by rotary transformers. The bird is fixed to the streamer by a bore closed by a cover. The bird can be detached automatically as the streamer is raised so that the streamer can be wound freely onto a drum. The disclosed method purportedly allows the full control of the deformation, immersion and heading of the streamer.

UK Patent 2,364,388, by Canter et al. discloses a method of repeating a marine seismic survey of a sub-surface area that has been previously surveyed.

U.S. Pat. Nos. 6,932,017; 7,080,607; 7,222,579 and 7,293,520 (all based directly or indirectly on PCT Application PCT/IB99/01590) describe various aspects of a control system for positioning of marine seismic streamers.

SUMMARY OF THE INVENTION

A method for towing a sensor streamer array in a body of water according to one aspect of the invention includes towing a plurality of sensor streamers behind a survey vessel in the water. A relative position is determined at selected points along each streamer with respect to the vessel. At least one streamer is deflected at least one longitudinal position therealong in response to the determined positions such that the streamers are maintained in a selected geometry in the water, in which positions along each streamer substantially follow a geodetic heading of the survey vessel.

A method for towing a sensor streamer array in a body of water according to another aspect of the invention includes towing a plurality of sensor streamers behind a survey vessel. A relative position is determined at selected points along each streamer with respect to the vessel. At least one streamer is deflected at least one longitudinal position therealong in response to the determined positions such that the streamers are maintained in a selected geometry in the water, in which determined positions along each streamer substantially follow a geodetic trajectory of a geophysical energy source towed in the water.

A method for towing a sensor streamer array in a body of water according to another aspect of the invention includes towing a plurality of sensor streamers behind a survey vessel. A relative position is determined at selected points along each streamer with respect to the vessel. At least one streamer is deflected at least one longitudinal position therealong in response to the determined positions such that the streamers are maintained in a selected geometry in the water, in which determined positions along each streamer substantially follow a selected geodetic path.

A method for towing a sensor streamer array in a body of water according to another aspect of the invention includes towing a plurality of sensor streamers behind a survey vessel. A lateral deflecting force is applied at selected positions along each streamer. The lateral deflecting force at each selected position is proportional to a lateral distance of a forward end of each streamer from a center line of the survey vessel.

Other aspects and advantages of the invention will be apparent from the following description and the appended claims.

DETAILED DESCRIPTION

Figure 1:
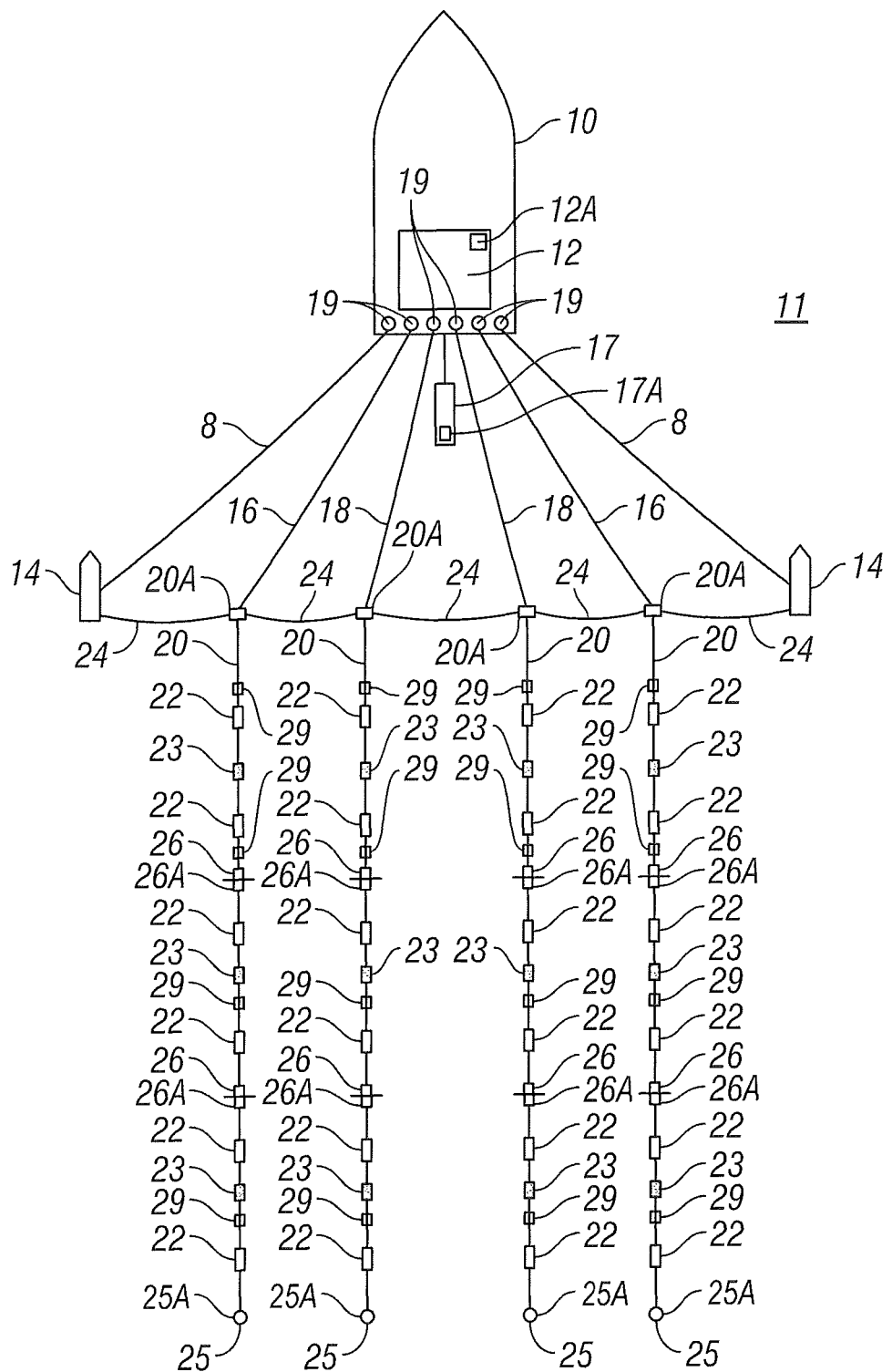
FIG. 1 shows an array of seismic streamers each including lateral force and depth control devices for adjusting geometry of the respective streamer.

FIG. 1 shows a typical marine geophysical survey system that can include a plurality of sensor streamers. Each of the sensor streamers can be guided through the water by one or more lateral force and depth ("LFD") control devices cooperatively engaged with each of the streamers. As will be explained further below, the use of LFD devices, which provide depth control capability in addition to horizontal position control, is a matter of choice. It is only necessary for purposes of the invention that the devices associated with the sensor streamers provide directional control, that is, to affect the direction of the streamer parallel to the plane of the water surface as it moves through the water. The geophysical survey system includes a survey vessel 10 that moves along the surface of a body of water 11 such as a lake or the ocean. The survey vessel 10 may include thereon equipment, shown generally at 12 and for convenience collectively referred to as a "recording system." The recording system 12 typically includes devices such as a data recording unit (not shown separately) for making a record with respect to time of signals generated by various sensors in the acquisition system. The recording system 12 also typically includes navigation equipment (not shown separately) to determine and record, at selected times, the geodetic position of the vessel 10, and using other devices to be explained below, each of a plurality of geophysical sensors 22 disposed at spaced apart locations on streamers 20 towed by the survey vessel 10.

In one example, the device for determining the geodetic position may be a geodetic position signal receiver 12A such as a global positioning system ("GPS") receiver, shown schematically at 12A. Other geodetic position determination devices are known in the art. The foregoing elements of the recording system 12 are familiar to those skilled in the art, and with the exception of the geodetic position detecting receiver 12A, are not shown separately in the figures herein for clarity of the illustration.

The geophysical sensors 22 can be any type of geophysical sensor known in the art. Non-limiting examples of such sensors may include particle motion-responsive seismic sensors such as geophones and accelerometers, pressure-responsive seismic sensors, pressure time gradient-responsive seismic sensors, electrodes, magnetometers, temperature sensors or combinations of the foregoing. In various implementations of the invention, the geophysical sensors 22 may measure, for example, seismic or electromagnetic field energy primarily reflected from or refracted by various structures in the Earth's subsurface below the bottom of the water 11 in response to energy imparted into the subsurface by an energy source 17. Seismic energy, for example, may originate from a seismic energy source, or an array of such sources, deployed in the water 11 and towed by the survey vessel 10 or by another vessel. Electromagnetic energy may be provided by passing electric current through a wire loop or electrode pair (not shown for clarity). The energy source (not shown) may be towed in the water 11 by the survey vessel 10 or a different vessel (not shown). The recording system 12 may also include energy source control equipment (not shown separately) for selectively operating the energy source 17.

In the survey system shown in FIG. 1, there are four sensor streamers 20 towed by the survey vessel 10. The number of sensor streamers shown in FIG. 1, however, is only for purposes of explaining the invention and is not a limitation on the number of streamers that may be used in any particular geophysical survey system according to the invention. As explained in the Background section herein, in marine geophysical acquisition systems such as shown in FIG. 1 that include a plurality of laterally spaced apart streamers, the streamers 20 are typically coupled to towing equipment that secures the forward end of each of the streamers 20 at a selected lateral position with respect to adjacent streamers and with respect to the seismic vessel 10. As shown in FIG. 1, the towing equipment can include two paravane tow ropes 8 each coupled to the vessel 10 at one end through a winch 19 or similar spooling device that enables changing the deployed length of each paravane tow rope 8. The distal end of each paravane tow rope 8 is functionally coupled to a paravane 14. The paravanes 14 are each shaped to provide a lateral component of motion to the various towing components deployed in the water 11 when the paravanes 14 are moved through the water 11. "Lateral" in the present context means transverse to the direction of motion of the survey vessel 10 in the water 11. The lateral motion component of each paravane 14 is opposed to that of the other paravane 14. The combined lateral motion component of the paravanes 14 separates the paravanes 14 from each other until they put into tension one or more spreader ropes or cables 24, functionally coupled end to end between the paravanes 14.

The sensor streamers 20 can each be coupled, at the axial end thereof nearest the vessel 10 (the "forward end"), to a respective lead-in cable termination 20A. The lead-in cable terminations 20A can be coupled to or associated with the spreader ropes or cables 24 so as to fix the lateral positions of the streamers 20 with respect to each other and with respect to the centerline of the vessel 10. Electrical and/or optical connection between the appropriate components in the recording system 12 and, ultimately, the geophysical sensors 22 (and/or other circuitry) in the ones of the streamers 20 inward of the lateral edges of the system may be made using inner lead-in cables 18, each of which terminates in a respective lead-in cable termination 20A. A lead-in termination 20A is disposed at the forward end of each streamer 20. Corresponding electrical and/or optical connection between the appropriate components of the recording system 12 and the sensors 22 in the laterally outermost streamers 20 may be made through respective lead-in terminations 20A, using outermost lead-in cables 16. Each of the inner lead-in cables 18 and outermost lead-in cables 16 may be deployed by a respective winch 19 or similar spooling device such that the deployed length of each cable 16, 18 can be changed. The type of towing equipment coupled to the forward end of each streamer shown in FIG. 1 is only intended to illustrate a type of equipment that can tow an array of laterally spaced apart streamers in the water. Other towing structures may be used in other examples of geophysical acquisition system according to the invention.

The acquisition system shown in FIG. 1 can also include a plurality of lateral force and depth ("LFD") control devices 26 cooperatively engaged with each of the streamers 20 at selected positions along each streamer 20. Each LFD control device 26 can include one or more rotatable control surfaces (not shown separately) that when moved to a selected rotary orientation with respect to the direction of movement of such surfaces through the water 11 creates a hydrodynamic lift in a selected direction to urge the streamer 20 in any selected direction upward or downward in the water 11 or laterally along the water surface with respect to the direction of motion of the vessel 10. Thus, such LFD control devices 26 can be used to maintain the streamers in a selected geometric arrangement. A non-limiting example of LFD device that may be used in some examples is described in U.S. Patent Application Publication No. 2008/0008033 by Fossum et al. The particular configuration of the LFD devices 26, however, is not a limit on the scope of the present invention. As previously explained, for purposes of the present invention it is only necessary for any devices used as the LFD devices 26 be able to apply a selectable lateral force to the associated streamers 20. Depth control of the streamers 20 may be provided passively, such as by providing the streamers 20 with a selected overall specific gravity, or by separate depth control devices (not shown). Therefore, any reference to "depth" control as provided by the LFD devices 26 is only intended to cover the present example implementation, such as using the device shown in the Fossum et al. '033 patent application publication referred to above. Any reference to active depth control of the streamers 20 is not a limit on the scope of the present invention. For purposes of defining the scope of the invention, therefore, the LFD devices 26 need only perform the function of "lateral force" control devices, and the inclusion of depth control as a part of the function of the LFD devices 26 explained herein is intended to ensure that those of ordinary skill in the art understand that the use of the example LFD devices 26 disclosed herein, and any other similar examples, are within the scope of the present invention.

In a particular implementation of the invention, a position determination device may be associated with each LFD device 26. In one example, the position determination device may be an acoustic range sensing device ("ARD") 26A. Such ARDs typically include an ultrasonic transceiver or transmitter and electronic circuitry configured to cause the transceiver to emit pulses of acoustic energy. Travel time of the acoustic energy between a transmitter and a receiver disposed at a spaced apart position such as along the same streamer and/or on a different streamer, is related to the distance between the transmitter and a receiver, and the acoustic velocity of the water. The acoustic velocity can be assumed to not change substantially during a survey, or it can be measured by a device such as a water velocity test cell. Alternatively or additionally, acoustic range sensing devices ("ARDs") may be disposed at selected positions along each one of the streamers not collocated with the LFD devices 26. Such ARDs are shown at 23 in FIG. 1. Each of the ARDs 26A, 23 may be in signal communication with the recording system 12 such that at any moment in time the distance between any two ARDs 26A, 23 on any of the streamers 20 is determinable. One or more ARDs may be placed at selected positions proximate the aft end of the vessel 10 so that relative distances between the selected positions on the vessel 10 and any of the ARDs on the streamers may also be determined. A non-limiting example of an ARD and system used with such ARDs is described in U.S. Pat. No. 7,376,045 issued to Falkenberg et al. and assigned to the assignee of the present invention.

The streamers 20 may additionally or alternatively include a plurality of heading sensors 29 disposed at spaced apart positions along each streamer 20. The heading sensors 29 may be geomagnetic direction sensors such as magnetic compass devices affixed to the exterior of the streamer 20. One type of compass device is described in U.S. Pat. No. 4,481,611 issued to Burrage and incorporated herein by reference. The heading sensors 29 provide a signal indicative of the heading (direction with respect to magnetic north) of the streamer 20 at the axial position of the heading sensor 29 along the respective streamer. Measurements of such heading at spaced apart locations along each streamer may be used to interpolate the geometry (spatial distribution) of each streamer.

Each streamer 20 may include at the distal end thereof a tail buoy 25. The tail buoy 25 may include, among other sensing devices, a geodetic position signal receiver 25A such as a GPS receiver that can determine the geodetic position of each tail buoy 25. The geodetic position receiver 25A in each tail buoy 25 may be in signal communication with the recording system 12.

By determining the distance between ARDs 26A, 23, including the one or more ARDs on the vessel 10, and/or by interpolating the spatial distribution of the streamers from the heading sensor 29 measurements, an estimate of the geometry of each streamer 20 may be made. Collectively, the geometry of the streamers 20 may be referred to as the "array geometry." For purposes of defining the scope of the present invention, the various position measurement components described above, including those from the heading sensors 29, from the ARDs 26A, 23, and, if used, from the additional geodetic position receivers 25A in the tail buoys 25, may be used individually or in any combination. The ARDs and heading sensors may be referred to for convenience in defining the invention as "relative position determination" sensors. By determining relative positions at each point along each streamer with reference to a selected point on the survey vessel or the energy source, is it possible to determine the geodetic position of each such streamer point if the geodetic position of the vessel or the energy source is determined. As explained above, the navigation portion of the recording system 12 may include a GPS receiver or any other geodetic location receiver 12A. In some examples, the energy source 17 may also include a geodetic position location receiver 17A such as a GPS receiver. A particular example of a system for determining relative positions of the streamers using acoustic signals is described in the Falkenberg et al. patent referred to above.

During operation of the geophysical acquisition system shown in FIG. 1, it may be desirable to adjust portions of the streamers 20 laterally in order to maintain a predetermined array geometry during geophysical surveying. The recording system 12 may be configured to send suitable control signals to each of the LFD devices 26 to move associated portions of each streamer 20 laterally. Such lateral motion may be selected so that each point along each streamer is located at a predetermined relative position at any moment in time. The relative positions may be referenced to the position of either the survey vessel 10 or the energy source 17. Examples of various array geometry control modes according to the invention are provided below.

During operation of the acquisition system shown in FIG. 1 when used for seismic surveying, for example, it is desirable for the streamers 20 to be arranged as evenly as practicable behind the vessel 10 to avoid "holes" in the survey coverage. "Evenly" or "even" in the present context means that the streamers 20 are substantially parallel to each other along their entire length, that there is substantially equal lateral distance between adjacent streamers, and that the streamers extend substantially parallel to a selected direction. Deviation from such an even arrangement, as is known in the art, may be caused by rip currents in the body of water 11 and propeller wash from the survey vessel 10, among other causes. "Holes" in the coverage is a condition known in the art wherein seismic sensors are disposed more sparsely than would be the case if the geometry of the array were "even" as defined above.

Figure 2:
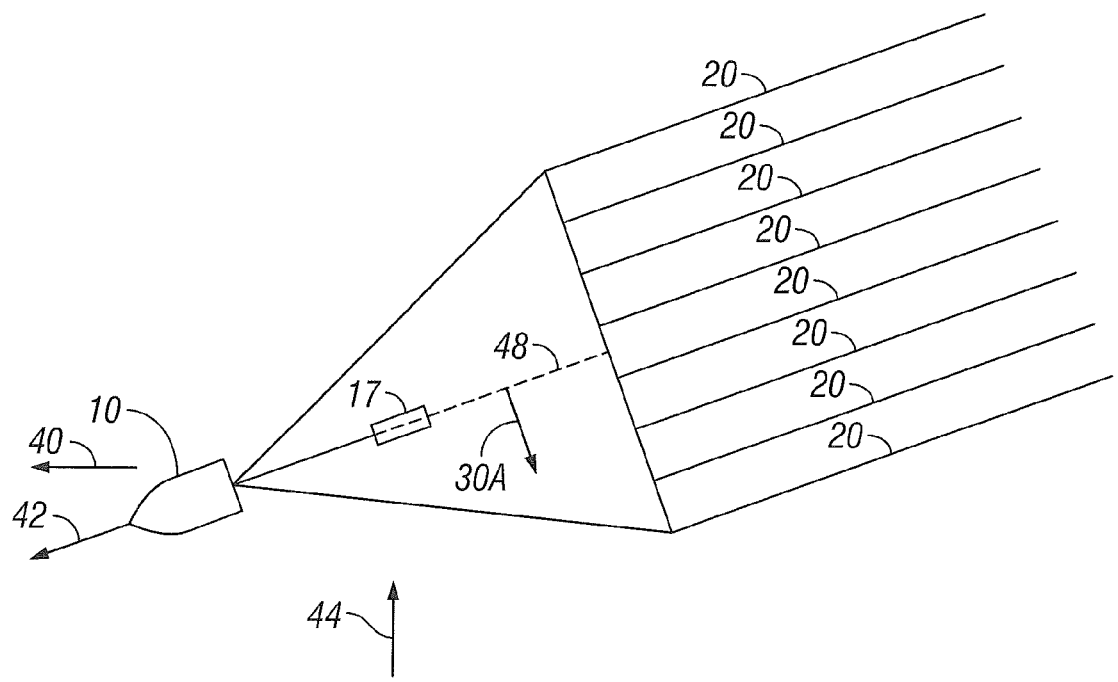
FIGS. 2 through 4 schematically show various examples of controlling array geometry according to the invention.

1. Vessel Heading Follow Mode: Referring to FIG. 2, an automatic technique to maintain a substantially even array geometry uses the vessel heading (geodetic direction) as a control parameter for adjustment of the array geometry. A sensor (not shown), such as a magnetic compass, in or associated with the recording system (12 in FIG. 1) measures the geodetic heading 42 of the survey vessel 10 and communicates such position to the recording system (12 in FIG. 1) at selected times according to operational programming of the recording system (12 in FIG. 1). The measurements of geodetic heading 42 may be filtered.

A method according to the Vessel Heading Follow Mode includes communicating control signals to each LFD device (26 in FIG. 1) such that the lateral distance of each streamer from each adjacent streamer as measured by the ARDs (23 and 26A in FIG. 1) is maintained at a selected value, and the streamers 20 are maintained substantially in a selected geometry with respect to the vessel heading direction. The selected geometry may be a straight line that is parallel to the direction of the vessel heading. However, the selected geometry may be a substantially straight line at an angle to the vessel heading direction. The selected geometry may be a streamer configuration in which the streamers are maintained in a configuration other than a straight line.

In the present example, the recording system may generate control signals for each LFD device such that the lateral distance 30A from the centerline 48 of the vessel measured by each of the ARDs is maintained at a selected value along the length of each streamer 20 and the geodetic position of any location along the streamers 20 follows the vessel heading trajectory.

The vessel heading 42 may differ from the vessel trajectory 40 because of the direction and magnitude of current flow 44 in the water 11. It is believed the vessel heading follow mode may have advantages under particular environmental conditions, such as when a current flow 44 in the water transverse to the towing direction varies in magnitude along the towing direction. An example of such transverse current would be found in an ocean lake or bay proximate the mouth of a river. Other examples will occur to those skilled in the art.

Figure 3:
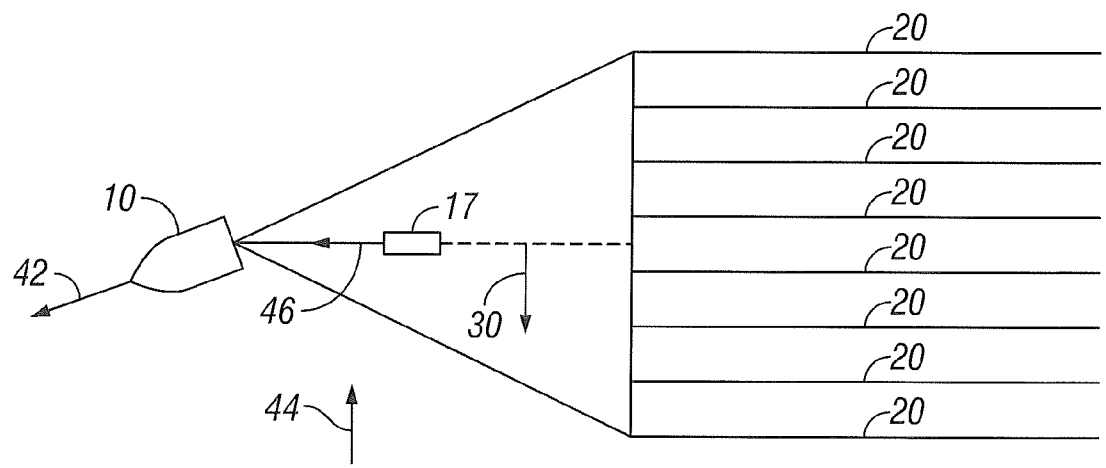

2. Source Trajectory Follow Mode: In another example, the trajectory 46 of the energy source (17 in FIG. 1) may be used as the reference for controlling the array geometry. Referring to FIG. 3, an automatic technique to maintain a substantially even array geometry uses the source trajectory (geodetic direction) 46 as a control parameter for adjustment of the array geometry. A filtered value of the source trajectory 46 is used as a reference to define the selected travel path for each streamer 20. The source trajectory 46 may be calculated in the navigation portion of the recording system. Such calculation may include making a record with respect to time of the geodetic position of the source 17 within selected time intervals. The calculation programming instructions may include a smoothing filter for the record of source position with respect to time. In the present example, the recording system may generate control signals for each LFD device such that the lateral distance 30 with respect to the source trajectory 46 measured by each of the ARDs is maintained at a selected value and/or the geodetic trajectory of any location along the streamers 20 follows the source trajectory.

A method according to the Source Trajectory Follow Mode includes communicating control signals to each LFD device (26 in FIG. 1) such that the lateral distance of each streamer from each adjacent streamer as measured by the ARDs (23 and 26A in FIG. 1) is maintained in a selected geometry with respect to the source trajectory direction. The selected geometry may be substantially a straight line that is parallel to the vessel trajectory direction. However, the selected geometry may be a substantially straight line at an angle to the vessel trajectory direction. The selected geometry may be a streamer configuration in which the streamers are maintained in a configuration other than a straight line.

3. Preplot Follow Mode: A seismic survey "preplot" line (a geodetic path defined by the subsurface area being investigated by the seismic survey) can also be used as a control variable for the selected travel path of each streamer. In the preplot follow mode, reference to the geodetic position and/or heading of the vessel or the source may be omitted. The array geometry may be configured to move the geophysical sensors along a path based only on the geodetic path intended to be followed by the sensors in maling measurements of the subsurface. In one example, a preplot survey path may be predetermined for a geophysical survey of an area of the subsurface, and for subsequent surveys conducted over the same area, the same preplot survey path may be utilized for conducting the subsequent geophysical surveys. In another example, subsequent geophysical surveys may be conducted over substantially the same area of the subsurface as a previous survey, and the recorded locations of the sensors from the previous survey are utilized for guidance in selecting the travel path for each streamer.

The preplot follow mode may have advantages in "4D" seismic surveying, wherein a survey is repeatedly conducted over a same area of the subsurface at selected times. As is known in the art, the accuracy of such 4D surveys may be increased by causing the geophysical sensors to as closely as possible follow a same geodetic path each time a survey is conducted. The preplot follow mode may improve the capability of the sensor array to make such repeated travel paths.

The preplot follow mode may be performed using geodetic position signals detected, for example, using the geodetic position signal receivers (25A in FIG. 1) on the tail buoys (25 in FIG. 1) to determine geodetic position of at least one point in the array. Relative positions between the sensors in the array may be determined as explained above using ARDs (23 and 26A in FIG. 1). Geodetic heading or direction of the streamers may be determined, for example, using the heading sensors (29 in FIG. 1) as explained above. The LFDs (26 in FIG. 1) may be operated such that the streamers follow a selected geodetic path substantially irrespective of the vessel position and the vessel heading. It will be appreciated by those skilled in the art that the possible range of array geometry may be limited by the lengths of the various towing components and the offset of the vessel trajectory from the centerline of the predetermined array travel path, however the preplot follow mode may be used to provide more consistent survey results between successive surveys of the same subsurface geodetic area than methods that control array geometry only by reference to the vessel trajectory or heading.

Figure 4:
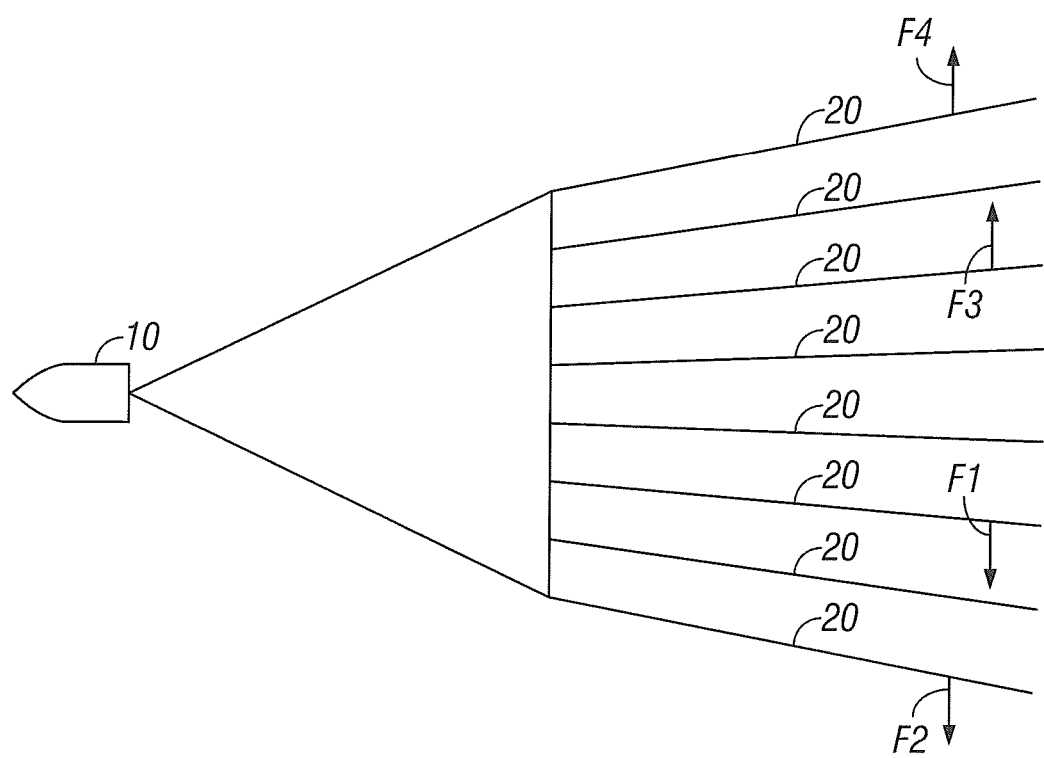

4. Proportional Force Separation Mode: During deployment and retrieval of the streamers from the vessel, and during periods of severe weather, the focus of the steering of seismic streamers is not on subsurface coverage, but on increasing the safety of the streamers from entanglement with each other. One way to obtain a high degree of safety is to apply a selected lateral force (or constant LFD steering element deflection angles) on each streamer in a direction outward from the centerline of the vessel, with the largest lateral force being applied on the laterally outermost streamers, and with a linear or other proportional relationship between the lateral force being applied on each streamer and the lateral distance from the centerline of the vessel of each respective streamer. As an example, for a 10 streamer array, the rightmost streamer (designated streamer 1) could apply a 400N (or, for example, a 15 degree "wing angle" on the LFD device) lateral force outward from the centerline of the vessel, and lateral outward forces of 320N, 240N, 160N and 80N, respectively, on streamers 2, 3, 4 and 5. The same lateral force values could be applied for streamers 6 through 10, but in the opposite direction from the centerline of the vessel. The foregoing steering principle is illustrated in FIG. 4, where lateral force F1 and F3 are smaller than corresponding lateral forces F2 and F4. The term "proportional" as used herein is intended to mean a substantially monotonically increasing force with respect to lateral distance from the centerline of the vessel and is not limited to a linear or other directly proportional relationship.

By providing such lateral outward forces on each streamer, a sufficient lateral separation of the streamers can be achieved even without the need for high quality position information, or even with no positioning information, whether relative or absolute. To further increase the safety of deployment and retrieval operations, the depth of each streamer could be related to lateral distance from the centerline of the vessel, such that separation of the streamers may be maintained in two planes.

It might sometimes be desirable to steer all devices in one direction. The principle then is as above, but with the outmost streamer on one side applying a large force and with a reduction of force for every streamer until zero or a small force is applied on the outermost streamer on the other side. The main principle of such mode is that an individually selected, constant force is applied to the steering devices to optimize streamer control.

Methods for operating LFD devices and controlling geometry of a sensor array according to the various aspects of the invention may provide more even coverage in marine geophysical surveying, may provide more accurate positioning of geophysical sensors, and may improve safety of the array in hostile environments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for towing a sensor streamer array in a body of water, comprising:
   towing a plurality of sensor streamers behind a survey vessel in the body of water;
   determining relative positions at selected points along each sensor streamer with respect to the survey vessel;
   determining a trajectory of a geophysical energy source towed by the survey vessel; and
   laterally deflecting at least one sensor streamer at a plurality of longitudinal positions therealong in response to the determined relative positions such that the at least one sensor streamer is maintained in a selected configuration in the water relative to the trajectory of the geophysical energy source.

2. The method of claim 1 wherein the determining relative positions comprises measuring acoustic travel time to a selected position along another sensor streamer.

3. The method of claim 1 wherein the determining relative positions comprises measuring geomagnetic direction.

4. The method of claim 1 wherein the sensor streamers comprise seismic sensors.

5. The method of claim 1 wherein the sensor streamers comprise electromagnetic sensors.

6. A method for towing a sensor streamer array in a body of water, comprising:
   towing a plurality of sensor streamers behind a survey vessel in the water;
   determining relative positions at selected points along each sensor streamer with respect to the survey vessel;
   determining a preplot survey path, wherein the preplot survey path includes a geodetic heading that differs from a trajectory of the survey vessel; and
   laterally deflecting at least one sensor streamer at a plurality of longitudinal positions therealong in response to the determined relative positions such that the at least one sensor streamer is maintained in a selected configuration in the water relative to the preplot survey path.

7. The method of claim 6 wherein the determining relative positions comprises measuring acoustic travel time to a selected position along another sensor streamer.

8. The method of claim 6 wherein the determining relative positions comprises measuring geomagnetic direction.

9. The method of claim 6 wherein the sensor streamers comprise seismic sensors.

10. The method of claim 6 wherein the sensor streamers comprise electromagnetic sensors.

11. A method for manufacturing a geophysical data product, comprising:
    towing a plurality of sensor streamers behind a survey vessel in a body of water;

determining relative positions at selected points along each sensor streamer with respect to the survey vessel;

determining a preplot survey path, wherein the preplot survey path includes a geodetic heading that differs from a trajectory of the survey vessel;

laterally deflecting at least one sensor streamer at a plurality of longitudinal positions therealong in response to the determined relative positions such that the at least one sensor streamer is maintained in a selected configuration in the water relative to the preplot survey path;

activating at least one energy source to produce energy;

detecting the energy via sensors coupled to the plurality of sensor streamers, wherein at least a portion of the detected energy has been modified by interactions with geophysical formations below the body of water; and recording, on a tangible computer-readable medium, data corresponding to the detected energy.

12. The method of claim 11, wherein the energy is seismic energy.

13. The method of claim 11, wherein the energy is electromagnetic energy.

14. The method of claim 11, wherein the determining relative positions comprises measuring acoustic travel time to a selected position along another sensor streamer.

15. The method of claim 11, wherein the determining relative positions comprises measuring geomagnetic direction.

* * * * *